UNITED STATES PATENT OFFICE.

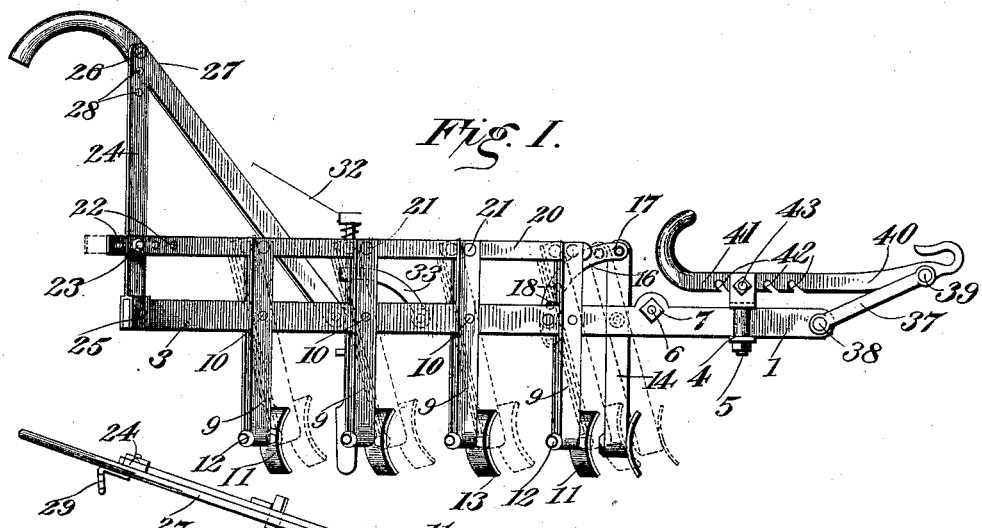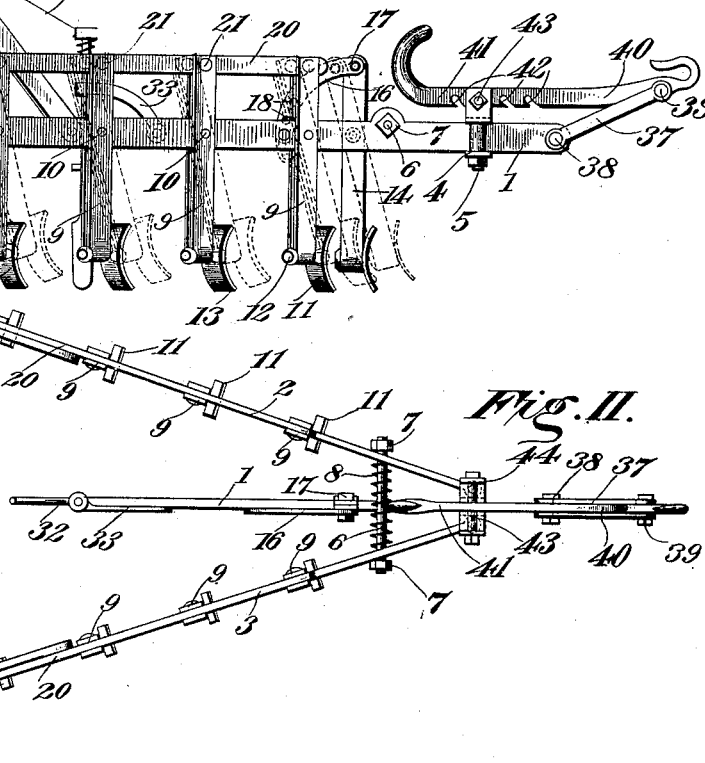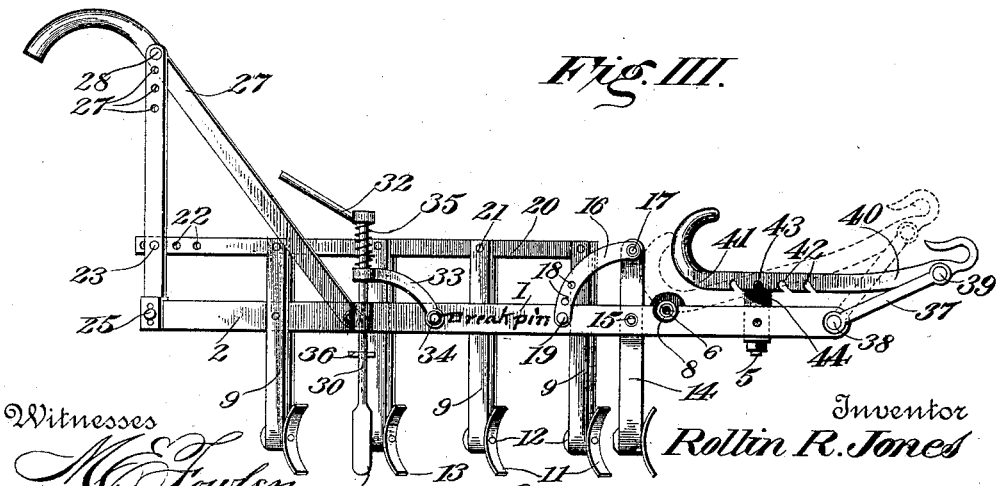

ROLLIN R. JONES, OF EAST BETHLEHEM, PENNSYLVANIA.

PLOW-CULTIVATOR.

SPECIFICATION forming part of Letters Patent No. 609,886, dated August 30, 1898.

Application filed April 14, 1896. Serial No. 587,447. (No model.)

*To all whom it may concern:*

Be it known that I, ROLLIN R. JONES, of East Bethlehem, county of Washington, State of Pennsylvania, have invented certain new and useful Improvements in Plow-Cultivators, of which the following is a specification, reference being had to the accompanying drawings.

My invention belongs in the main to that class of plow-cultivators in which the shovels are carried upon transversely-adjustable beams.

Of the manifold features through which I increase the practical efficiency I enumerate those which are most important, reserving to the appended claim complete and full definitions of all the points involved in my invention.

Enumerating accordingly some of the features comprehended in this invention I employ, first, a V-shaped frame composed of beams pivotally united, respectively, at one end, transversely adjustable, and automatically maintained at the proper angle with respect to each other; second, a guide for directing the plow in a straight line or row, which is especially valuable in practice for hillside-plowing; third, improved draft-directing mechanism; fourth, improved plow-shovels; fifth, shanks pivoted to the beam with separate frangible connections which, breaking under undue strain, will permit the shanks to turn upon their pivots and save the plows; sixth, mechanism for adjusting the inclination of the shanks with respect to the beams.

In the accompanying drawings, Figure I is a side elevation of my plow, showing the shanks in the vertical position in full lines and in the inclined position in dotted lines. Fig. II is a top plan view of the same. Fig. III is a view similar to Fig. I with one of the wing-beams removed, showing the guide and illustrating the draft-regulator in different positions in full and dotted lines, respectively.

Referring to the figures on the drawings, 1 indicates the main or medial beam of my cultivator, and 2 and 3 the lateral or wing beams. The wing-beams are pivotally united at their forward ends and preferably through the main beam. For this purpose a box 4 may be employed, secured to the main beam near its forward end and to the wing-beams, as by bolts 5.

6 indicates a transverse rod located between the wing-beams. The heads 7, which may consist of nuts screwed upon the ends of the rod, serve to limit the outward movements of the wing-beams, while a spring 8, coiled around the rod 6 and seated at its opposite ends against the inner sides of the beams, tends to keep them separated.

9 indicates each of the plow-shanks pivotally secured, as by bolts 10, respectively, to the wing-beams. Each shank projects above and below the beam to which it is secured, and on its lower end carries a shovel 11.

12 indicates the bolts, by which the shovels, respectively, are secured to their respective shanks. The shovels are curved in the arc of a circle, so that they are reversible, the bolt of each one piercing it approximately through its middle. The edges 13 of the shovels are made straight, with squared corners, and are in that way adapted to cut weeds instead of brushing them aside.

14 indicates the foremost plow-shank, which is pivotally united, as indicated at 15, to the beam 1.

16 indicates an arm that is securely pivoted at one end, as indicated at 17, to the shank and which is provided at its opposite end with a series of holes 18, whereby the inclination of the shank 14 may be adjusted by inserting a pin 19 through one of the series of holes and through a hole provided for it in the beam 1. The particular hole of the series which is selected determines the angle of inclination of the shank. I prefer that the pin 19 shall be frangible—as, for example, of wood. By this provision when undue strain is brought to bear upon the lower end of the shank 14 the pin 19 breaks, allowing the shank 14 to turn upon its pivot 15 without injuring the shank or the shovel. Each of the shanks 9 may be independently adjustably secured to the wing-beam, which carries it in the same manner in which the shank 14 is secured to the beam 1; but I prefer to render all of the shanks on one wing-beam correspondingly and simultaneously adjustable. With this object in view I employ a bar 20, which is pivotally secured to each of the shanks 9, as by frangible or wooden pins 21, and which, being moved lengthwise of the wing-beam, may cause all of the shanks 9 on that beam to move upon their pivots 10. For fixing the adjustment thus obtained suitable mechanism should be provided, and a simple form consists in a series of holes 22 in the rearward end of the bar 20, through any one of which a bolt 23 may be passed and secured to an upright piece 24, which is pivotally secured at its lower end, as indicated at 25, to the wing-beam. At its upper end, through a series of holes 26, it may be adjustably secured to a vertically-movable handle-bar 27, as by means of a bolt 28. By changing the relative positions of the bar 20 to the upright 24 and of the latter to the handle-bar 27 any required adjustment can be made.

Upon one or each of the handle-bars I prefer to employ a line hook or holder 29. Near the rearward end of the beam 1 I provide a guide 30, that is preferably yieldingly secured to the beam, so as to move vertically thereon, but with a constant downward tendency. The guide carries on its lower end a cutting edge or wheel 31, that, cutting into the surface of the ground, secures the cultivator in a fixed position and compels it readily to follow under proper guidance a straight line. The guide 30 is pivotally mounted in the beam 1, so that by a handle 32 it may be turned in one direction or the other and made to guide the cultivator.

33 indicates a support that collars the guide 30 at one end and that is secured at the opposite end, as by a frangible pin 34, to the beam 1. A coiled spring 35 around the upper end of the guide is secured at one end to the guide and at the other end to the support 33, or it may be directly secured to the beam 1. The tendency of the coiled spring is to yieldingly force the guide against the ground, while the movement of the guide in the opposite direction is limited by a pin 36, which passes through the guide underneath the frame 1.

37 indicates a link pivoted at one end, as indicated at 38, to the beam and at the other end, as indicated at 39, to a draft-hook or the like 40. The rearward end of the draft-hook is provided with a sweep 41, that extends back in the direction of the beam, 1 and is provided with notches 42, that are adapted to hook upon a cross-bolt 43, secured, as in bearings 44, upon the beam 1. By moving the sweep 41 backward or forward the elevation of the hook 40 can be adjusted to any desired height, and when adjusted may be secured by hooking the nearest available notch 42 over the rod 43.

The material of which my cultivator may be constructed may be either wood or metal, and any material may be selected which is best adapted for the purpose to which the implement is to be applied.

What I claim is—

In a cultivator, the combination with a main beam, wing-beams and shovel-shanks, of a rearwardly-projecting end upon the main beam, a vertically-movable guide carried therein, a support movably secured to the guide at one end, and secured to the beam at the other end by a frangible connection, and a coiled spring uniting the guide to the support, so as to render the former yieldingly movable, substantially as set forth.

In testimony of all which I have hereunto subscribed my name.

ROLLIN R. JONES.

Witnesses:
GREGG LEWELLEN,
CHAS. E. BAKER.